United States Patent [19]
Buchanan

[11] Patent Number: 5,174,685
[45] Date of Patent: Dec. 29, 1992

[54] FLEXIBLE PIPE LAYING AND COVERING APPARATUS

[76] Inventor: Luther B. Buchanan, Buchanan's Contractors, P.O. Box 591, Clarksville, Va. 23927

[21] Appl. No.: 853,145

[22] Filed: Mar. 18, 1992

[51] Int. Cl.$^5$ .......................... E02F 5/12; E02D 11/02
[52] U.S. Cl. ..................................... 405/179; 405/50; 405/174; 405/282
[58] Field of Search ................. 405/50, 174, 179, 272, 405/282, 283

[56] References Cited

U.S. PATENT DOCUMENTS

| | | | |
|---|---|---|---|
| 3,664,137 | 5/1972 | Lett | 405/50 |
| 3,831,388 | 8/1974 | Wells | 405/179 X |
| 3,849,998 | 11/1974 | Thacker | 405/179 |
| 3,859,809 | 1/1975 | Clayhdd et al. | 405/179 |
| 4,028,902 | 6/1977 | Courson et al. | 405/179 X |
| 4,091,626 | 5/1978 | Thompson | 405/283 |
| 4,289,424 | 9/1981 | Shefbuch et al. | 405/179 |
| 4,462,715 | 7/1984 | Ashbaugh | 405/157 |
| 4,741,646 | 5/1988 | Hatch | 405/179 |
| 4,806,043 | 2/1989 | Fournier | 405/50 X |
| 4,830,537 | 5/1989 | Munro et al. | 405/179 |

Primary Examiner—Randolph A. Reese
Assistant Examiner—Arlen L. Olsen
Attorney, Agent, or Firm—Nies, Kurz, Bergert & Tamburro

[57] ABSTRACT

Apparatus for laying flexible pipe within a trench and for embedding the flexible pipe within a bed of gravel in a single operation. The apparatus includes a gravel hopper and a guide sleeve for guiding a pipe to be laid within the trench. The hopper includes a skid or sled arrangement to permit it to be pulled along the trench bottom, and has a width to permit it to be completely positioned within the trench and thereby accommodate a wide variety of trench depths. A feed guide support stanchion extends from the front portion of the hopper for facilitating the feeding of a flexible pipe into a pipe guide inlet positioned adjacent the bottom portion of the front wall of the hopper. The hopper interior is divided into a main, narrow portion, and a rear, enlarged portion, the side walls of which are adapted to engage the side walls of the trench. The hopper rear portion side walls have a small surface area to minimize sliding friction with the trench walls. The apparatus permits a pipe to be laid without requiring personnel to be located within the trench, thereby avoiding the increased costs required by OSHA regulations that require either tapered trench walls or braced trench walls in order to avoid a cave-in when personnel are in the trench.

12 Claims, 4 Drawing Sheets

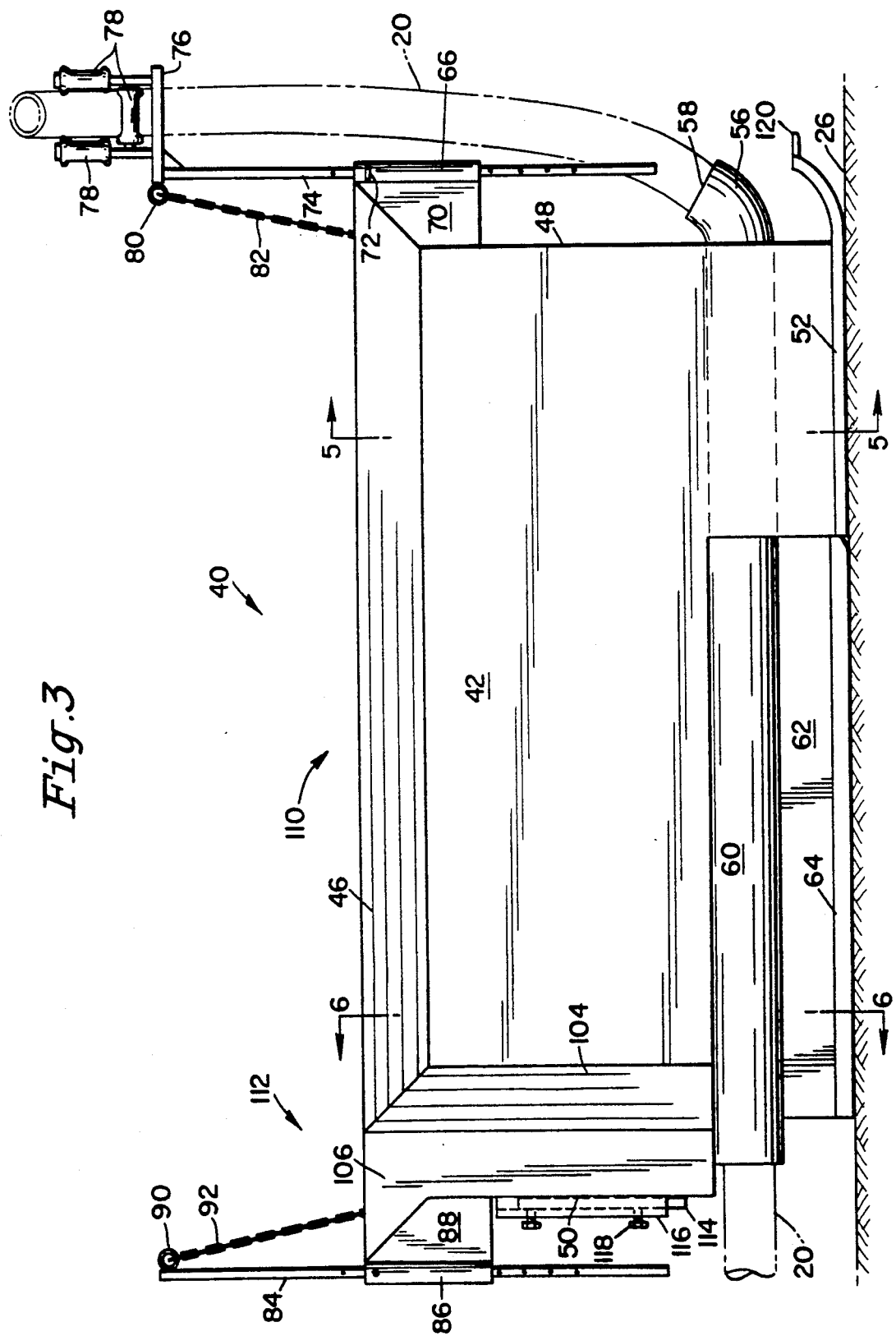

FLEXIBLE PIPE LAYING AND COVERING APPARATUS

BACKGROUND OF THE INVENTION

1. Field of the Invention

The present invention relates to apparatus for laying flexible pipe in a ditch, and for surrounding the pipe with gravel, sand, or the like. More particularly, the present invention relates to a pipe laying device that positions a flexible pipe at a desired elevation above the floor of a trench and that surrounds the pipe with particulate material that is deposited to cover the pipe with a predetermined depth of particulate material above the uppermost surface of the pipe.

2. Description of the Related Art

Known devices for positioning pipe in a trench include a hopper for carrying gravel or other fill material to be deposited around the pipe, and a guide tube that extends through the interior of the hopper for guiding the pipe that is intended to be laid. For example, in U.S. Pat. No. 4,289,424, which issued Sep. 15, 1981, to Robert J. Shefbuch et al., there is shown and described a pipe laying apparatus in which the hopper has a rearwardly sloping lower wall, and an inclined support tube for supporting the pipe to be laid. The support tube terminates rearwardly of the hopper end wall. The hopper is provided in the form of a rectangular container that has side walls adapted to contact the trench side walls, and the hopper side walls and bottom wall each carry tines for raking the adjacent trench side walls and bottom wall as the hopper is drawn along the ditch.

The upper portions of the side walls of the Shefbuch et al. structure include upwardly and outwardly flaring surfaces to define a substantially funnel-shaped cross section. However, because of the cross-sectional shape of the hopper the depth of the trench within which such a hopper can be used is limited, because of the requirement that the hopper side walls contact the side walls of the trench. Thus, if the trench were, say, 8 or 10 feet deep, the hopper side walls, of necessity, would need to be of least that depth, to permit the outward flaring portions of the hopper side walls to be above ground level. Additionally, the large contact area between the hopper side walls and the trench side walls results in very high frictional drag forces, thereby slowing the pipe installation process and requiring high powered vehicles to pull the hopper along the trench.

The depth below the ground at which a perforated drainage pipe must be positioned varies from one part of the country to another, and depends in large part upon the porosity of the surrounding soil. For example, in parts of Ohio the depth specified by local regulations is of the order of about 3 feet. On the other hand, in Southern Virginia the regulations prescribe the depth to be 3 feet or more.

When constructing a drainage field in an area where the depth of the trench is greater than 5 feet the construction cost rise significantly. For that depth and for greater depths the regulations of the Federal Occupational Safety and Health Administration (OSHA) require that if workers are present in the trench it is necessary that the trench be sloped, or that the sides of the trench be braced or supported in order to prevent a cave-in. However, to provide the required slopes or support renders the pipe installation operation considerably more costly than it would be if such slopes or support structure were not required. Therefore, it is desirable that where drain fields or the like are to be constructed and the depth of the drain trench is greater than 5 feet the pipe installation apparatus be so constructed that it is unnecessary for a person to actually physically be within the trench during the pipe laying and covering operation.

It is an object of the present invention to provide improved apparatus for laying flexible pipe within a trench and for simultaneously burying the flexible pipe within bed of gravel in a single operation.

It is another object of the present invention to provide a flexible pipe laying and covering device that is of simple construction, and that can be employed in ditches having depths ranging from two feet to over twelve feet.

It is a further object of the present invention to provide a flexible pipe laying and covering device that presents a reduced contact area with the side walls of the trench, to reduce the pulling force necessary to draw the device along the trench.

It is a still further object of the present invention to provide a flexible pipe laying and covering device that does not require the presence of workers within the trench.

SUMMARY OF THE INVENTION

Briefly stated, in accordance with one aspect of the present invention, apparatus is provided for laying flexible pipe within a trench and for burying the flexible pipe within a bed of gravel in a single operation. The apparatus includes a gravel hopper that is adapted to be received within an excavated trench, the hopper having a pair of spaced, opposed side walls and a pair of spaced, opposed front and rear walls. The side walls and the front and rear walls are disposed to define a substantially rectangular hopper having an open top and an open bottom.

A pipe guide sleeve is carried by the hopper for receiving and guiding a pipe to be deposited in the trench. The guide sleeve extends longitudinally of the hopper from a guide sleeve inlet opening positioned forward of the front wall to a guide sleeve outlet opening spaced rearwardly from the front wall and terminating at an outlet opening that is positioned forwardly of the rear wall.

A pipe feed guide member is carried adjacent to and above the front wall for supporting and guiding a length of pipe as it moves from a point adjacent the trench to the pipe guide sleeve inlet.

The hopper has a front section and a rear section, the rear section having a width greater than the width of the front section and adapted to slidably engage opposed sides of the trench for guiding the hopper with minimal frictional resistance with the trench side walls as the hopper is drawn along the trench.

BRIEF DESCRIPTION OF THE DRAWINGS

FIG. 3 is a side elevational view of a flexible pipe laying and covering device in accordance with the present invention.

DESCRIPTION OF THE PREFERRED EMBODIMENTS

Figure 1:
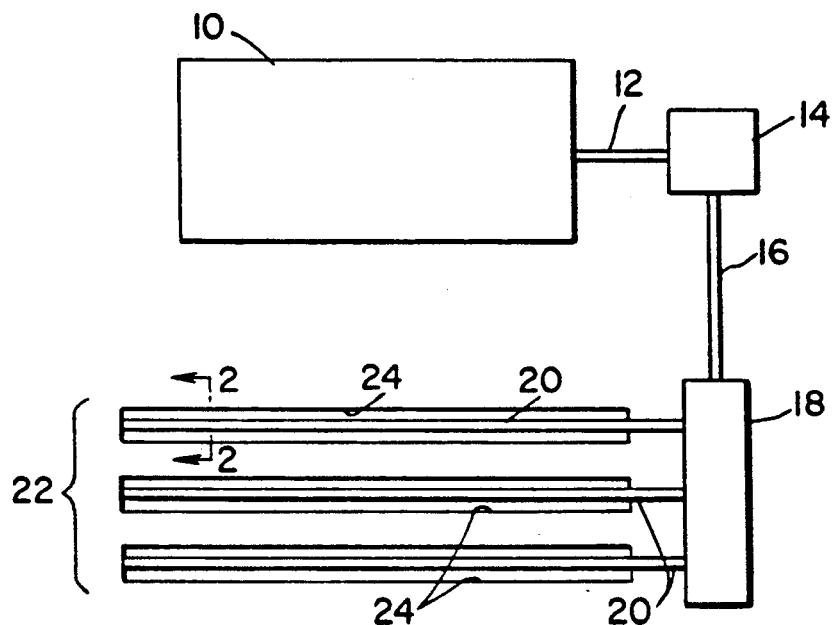
FIG. 1 is top plan view of a drainage field showing the connection of the field with a house.

Referring now to the drawings, and particularly to FIG. 1 thereof, there is shown in schematic form a house 10, from which a sanitary drain pipe 12 extends and empties into a septic tank 14 that receives waste materials and to which suitable biological agents can be added, if desired, to decompose the waste materials. The liquid wastes are conveyed from septic tank 14 by a conduit 16 to a distribution box 18 from which a plurality of header pipes 20 extend underground into a drainage field 22 for the purpose of distributing the liquid waste material and permitting it to percolate into the ground.

Pipes 20 are each perforated to permit liquid to drain therefrom and into the surrounding ground, and each pipe 20 is received in a respective trench 24 that contains gravel to facilitate drainage of the liquid from the pipes into the surrounding earth. The length and number of the header pipes 20 that are necessary in a particular drainage field is specified by local regulations, and is selected to handle the volume of waste that is anticipated to be generated.

Figure 2:
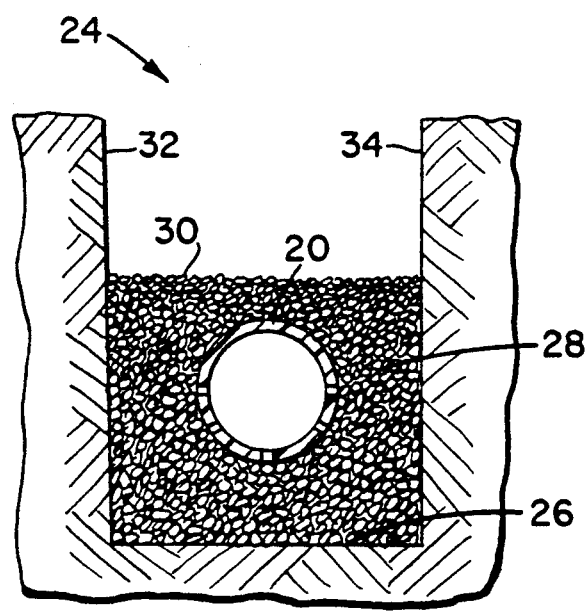
FIG. 2 is a transverse, cross-sectional view of a drainage ditch showing a drain pipe in position within a bed of gravel, taken along the line 2—2 of FIG. 1.

Referring now to FIG. 2, there is shown a cross-sectional view through a trench 24 that has a depth to conform with local regulations to define a trench base 26. A perforated drain pipe 20 is positioned within trench 24 at a height above trench base 26 that, again, conforms with local regulations. After pipe 20 is positioned on or above trench base 26 a bed 28 of gravel or other porous material is deposited in trench 24 to completely surround the pipe, and to cover the top of the pipe to a distance that is again is upon local regulations. The portion of the trench above the stop surface 30 of the gravel can be backfilled with earth that was excavated to form the trench. As illustrated in FIG. 2, trench 24 preferably has vertical side walls 32, 34, to avoid disturbing the surrounding ground. Vertical side walls 32 and 34 can be easily be formed when the trench is dug by using a backhoe. The depth of trench 24 is dependent upon local regulations, and the distance from trench base 26 to ground level can be anywhere from 2 feet to about 12 feet, depending upon in which part of the country the drain field is installed and the drainage conditions of the soil in the locality.

Referring now to FIG. 3, there is shown a side elevational view of a flexible pipe laying and covering device 40 in accordance with the present invention. Device 40 includes a pair of opposed, spaced, parallel side walls 42, 44, only one of which is visible in FIG. 3. Side walls 42, 44 define the sides of a hopper 46 for receiving gravel, or the like, and hopper 46 includes a front wall 48 and a rear wall 50, each of which extends transversely between respective side walls 42 and 44 in opposed, spaced, parallel relationship. Side walls 42, 44, front wall 48, and rear wall 50 together define a rectangular cross section that has a length of any convenient dimension, depending upon the volume of fill material that is intended to be distributed, and that preferably has a width dimension to permit hopper 46 to be received within a drainage trench.

Hopper 46 includes a pair of longitudinally extending front skid plates or runners 52, 54, only one of which is visible in FIG. 3, to permit the hopper to be dragged along the base 26 of a trench while the pipe laying and covering operation takes place. skid plates 52 and 54 need not extend the entire length of hopper 46, and, as shown, can be about one-fourth the length of hopper 46.

A curved, pipe guide inlet 56 in the form of a pipe elbow is secured to front wall 48 and extends forwardly and upwardly to define a pipe-receiving opening 58. Pipe guide inlet 56 extends linearly rearwardly from front wall 48 to define a linearly extending pipe guide sleeve 60 having a predetermined diameter to slidably receive a pipe to be installed within the trench. Sleeve 60 is positioned above the lowermost surface of front skid plates 52, 54 by a guide sleeve spacer plate 62 so that the pipe is laid at the desired height above trench base 26. Spacer plate 62 includes along its lowermost surface a transverse guide sleeve skid plate or runner 64, that can also be of tubular shape, if desired, and is adapted to contact and ride along trench base 26.

Figure 4:
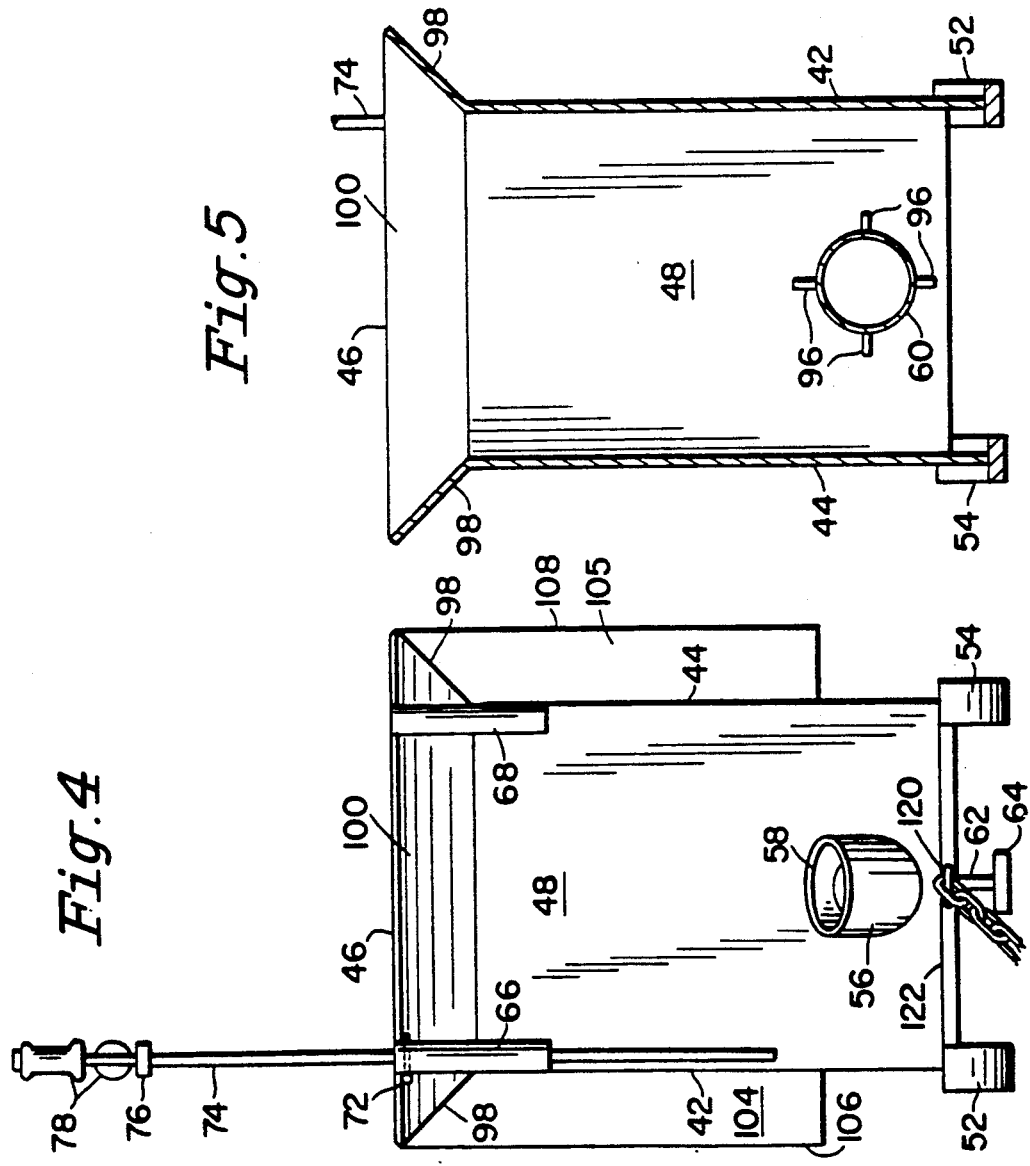
FIG. 4 is a front elevational view of the pipe laying and covering device shown in FIG. 3.

Also carried by front wall 48 are a pair of pipe feed guide support sleeves 66, 68 (see FIG. 4) that are secured to front wall 48 by respective feed guide support gussets 70. Each support sleeve 66, 68 includes a T-shaped retainer pin 72 that is adapted to engage with corresponding positioning apertures formed in support sleeves 66 and 68 and also in a pipe feed guide stanchion 74. As best seen in FIG. 3, stanchion 74 includes a crossbar 76 that carries a plurality of rotatable spool members 78 that are positioned so that a flexible pipe 20 can pass therebetween from the ground alongside a trench down toward and into pipe guide inlet 56. Pipe feed guide stanchion 74 can be supported in either of feed guide support sleeves 66 or 68, depending upon on which side of the trench the supply of feed pipe is positioned. For convenience, crossbar 76 includes a connection eye 80, to which a hook on the free end of a front lifting chain 82 can be attached for holding the chain while the device is being used to lay a pipe.

Hopper 46 also includes a rear lifting stanchion 84 that is received in one of lifting stanchion sleeves 86 or 87 (see FIG. 7) carried by a sleeve support gusset 88 that is, in turn, secured to rear wall 50. Rear lifting stanchion 84 also carries a connection eye 90, to which a hook on the free end of a rear lifting chain 92 can be attached for holding the chain while the device is being used to lay pipe. Chains 82 and 92 are connected to hopper 46 for lowering and lifting the hopper into and out of a trench. In addition to the lifting and lowering operations, each of rear lifting stanchion 84 and pipe feed guide stanchion 74 also remain in elevated position after hopper 46 is placed in a trench and serve to indicate the position along the trench of hopper 46. The extension of the stanchions from hopper 46 is particularly helpful when the hopper is completely below the surface of the ground, and they thereby facilitate access to the hopper by a front loader operator so that the hopper can be quickly located for the purpose of adding additional gravel as the gravel is put in place around a pipe as the pipe is being laid.

Figure 6:
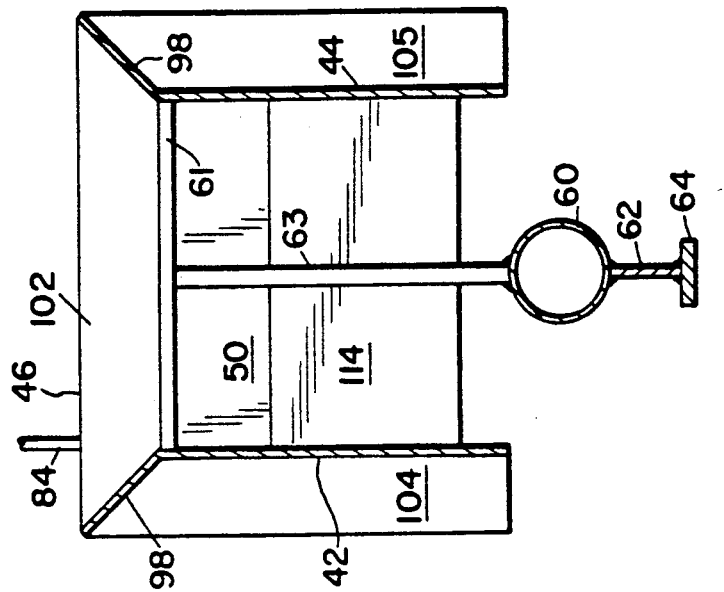
FIG. 6 is a cross-sectional view taken along the line 6—6 of FIG. 3.
Figure 5:
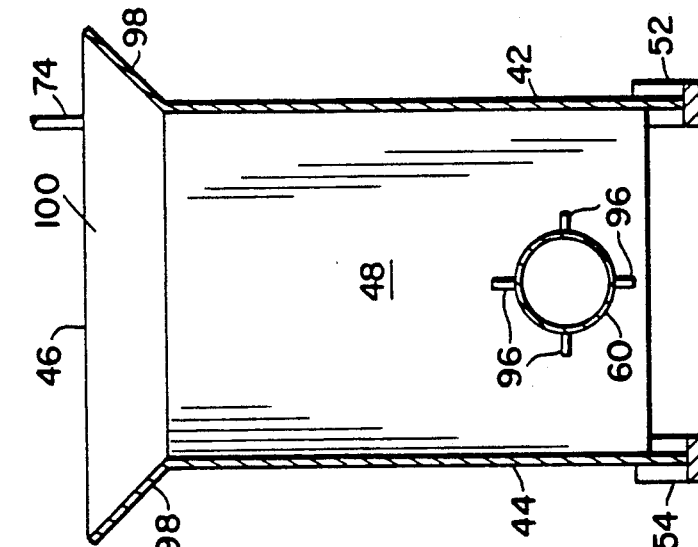
FIG. 5 is a cross-sectional view taken along the line 5—5 of FIG. 3.
Figure 7:
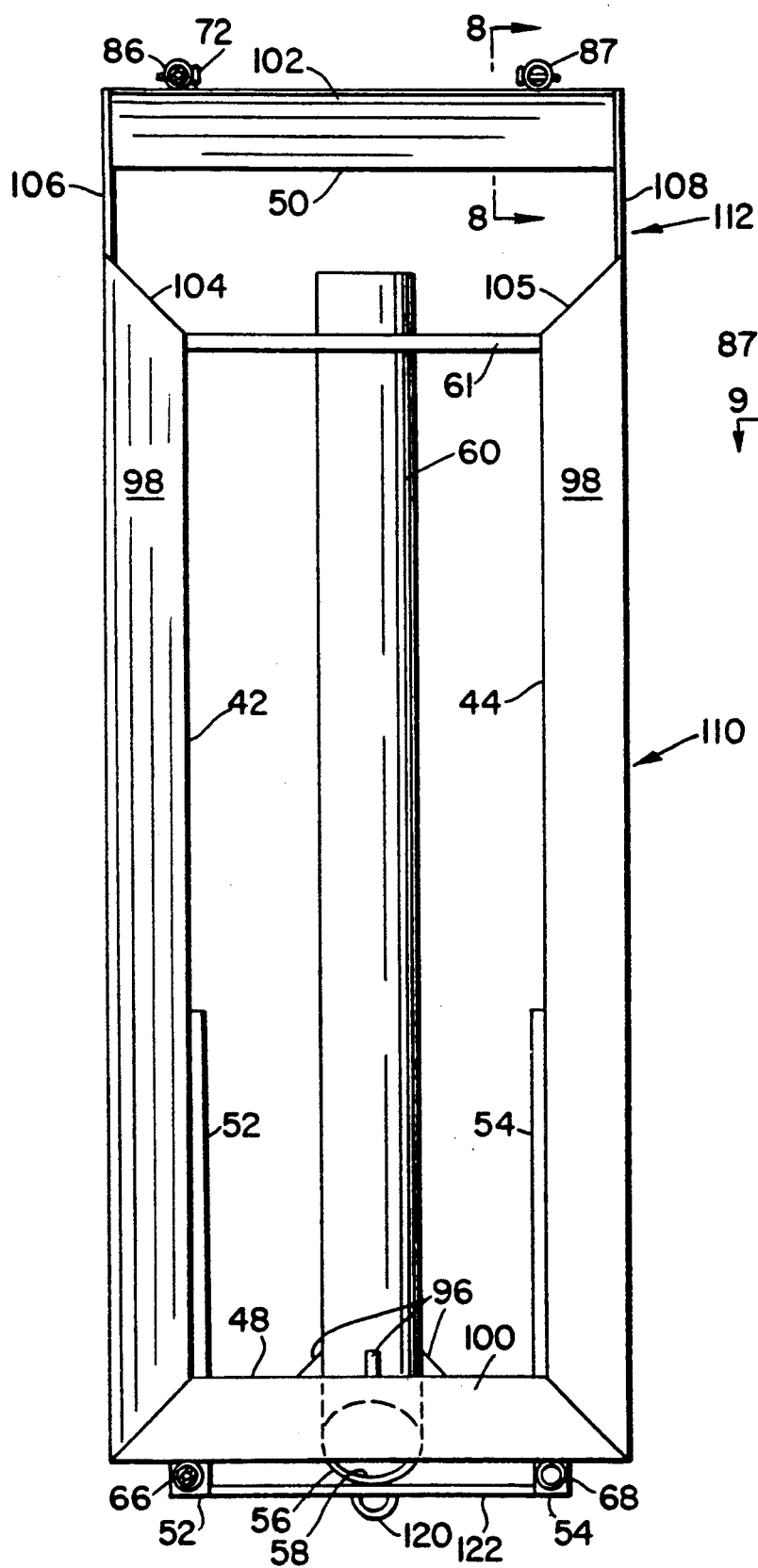
FIG. 7 is a top plan view of the flexible pipe laying and covering device shown in FIG. 3.

Pipe guide sleeve 60 extends longitudinally of hopper 46, as shown in FIGS. 5, 6, and 7, and is positioned between side walls 42 and 44 at the desired elevation above front skid plates 52, 54 to extend substantially parallel with the base of the trench. Guide sleeve 60 is supported by four triangular support gussets 96 that connect guide sleeve 60 with front wall 48 to securely support and hold the sleeve. The rearmost portion of sleeve 60 is supported from a crossbar 61 by a support member 63 that is connected with sleeve 60 to suspend it at the desired height above the lowermost surface of the trench.

As also shown in FIG. 5, side walls 42 and 44 each include upwardly and outwardly flaring upper edge portions 98 to facilitate dumping of the gravel into the hopper. The outermost edges of the respective edge portions are spaced a distance corresponding with the trench width, or slightly smaller, to permit the entire structure 40 to be received within the trench and between the trench walls. A corresponding upwardly and outwardly flaring edge portion 10 extends from front wall 48, and a corresponding portion 102 extends from rear wall 50.

As best seen in FIG. 7, side walls 42 and 44 extend rearwardly from front wall 48 to a point that is forward of rear wall 50. Each side wall then flares rearwardly and outwardly along respective transition sections 104, 105 between the front hopper portion 110 that is defined by the parallel side walls 42, 44, and a rear hopper portion 112 of greater width than portion 110 and defined by a pair of spaced, opposed, parallel contact walls 106, 108 that extend to and connect with rear wall 50. Walls 106 and 108 are adapted to contact the side walls of the trench.

Rear portion 112 of hopper 46, the portion extending rearwardly from transition sections 104, 105, has a substantially smaller longitudinal length than the narrower, front portion 110 of the hopper, and in a preferred form of the invention front portion 110 of hopper 46 has a longitudinal length of about 68½ inches whereas the enlarged width rear 112 portion has a longitudinal length of only about 12 inches. Because of the interconnection of the transition sections 104, 105 between contact walls 106 and 108 and the respective hopper side walls, the longitudinal length of the respective contact walls is on the order of about 6 inches in the preferred form of the invention as heretofore described. Although specific dimensions have been given herein, it will be apparent that the dimensions can be changed for particular applications of the apparatus. However, it is preferred that the enlarged rear portion comprise only a minor portion of the total longitudinal length of the hopper, to minimize frictional drag as the hopper is drawn along the trench.

Figure 8:
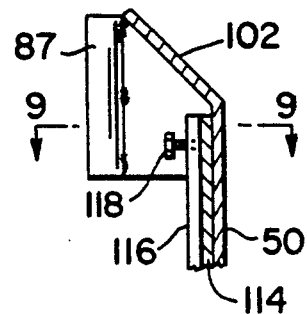
FIG. 8 is a fragmentary cross-sectional view taken along the line 8—8 of FIG. 7.
Figure 9:
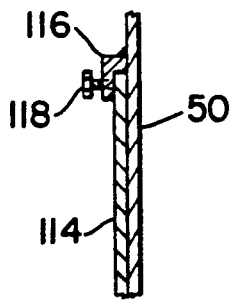
FIG. 9 is a fragmentary cross-sectional view taken along the line 9—9 of FIG. 8.

Rear wall 50 carries a vertically shiftable scraper plate 114, as shown in FIGS. 8 and 9, to define the upper level of the surface of the gravel bed relative to the top of the drain pipe. Scraper plate 114 can be shifted vertically along a track defined by a pair of opposed angle members 116, as best seen in FIG. 9, each angle member carrying one or more clamping bolts 118 for clamping scraper plate 114 in a desired position against rear wall 50 to provide the desired gravel bed height.

Preferably hopper 46 is made from steel plate having a thickness of about ⅛ inch to withstand the weight of gravel that is deposited into the hopper as a pipe is being laid.

In operation, a trench is first dug having a depth and a width in accordance with applicable local regulatory requirements. The pipe laying and covering device 40 in accordance with the present invention is then lowered into the trench by means of chains 82 and 92 that extend from the front and rear portions of hopper 46, until hopper 46 comes to rest on the base of the trench.

A length of perforated pipe 20 positioned adjacent and above the trench is first manually threaded through the opening defined in the pipe feed guide carried on the upper end of stanchion 74, as shown in FIG. 3, and is then inserted into opening 58 in pipe guide inlet 56 adjacent the lower portion of front wall 48 of the hopper. Pipe 20 is pushed into inlet 56 and along pipe guide sleeve 60 until it exits from the guide sleeve at a point spaced inwardly from hopper rear wall 50, as best seen in FIG. 3.

When pipe 20 is in position illustrated in FIG. 3, the hopper is loaded with gravel of the required size, and because the hopper has no bottom wall and is completely open around guide sleeve 60, the gravel falls through the hopper onto the base of the trench and builds up to surround guide sleeve 60 and to fill the interior of the hopper.

After hopper 46 has been filled with gravel, a pull chain is connected with attachment eye ring 120 carried on a cross member 122 extending between front skid plates 52, 54, as best seen in FIG. 7. The pull chain can be attached to a tractor, a backhoe, or the like, which is then driven along the ground beside the trench to pull the hopper along the base of the trench. As the hopper moves, the initial section of perforated pipe is held in position in the trench by the surrounding gravel by virtue of the positioning of the pipe exit opening in sleeve 60 forwardly of rear wall 50. Thus pipe is drawn into pipe guide inlet 56 as the preceding portion of the pipe passes through and outwardly of pipe guide sleeve 60. Because of the enlarged rear portion 112 of hopper 46, the gravel flows completely around the pipe and above it to a level determined by the position of the lowermost edge of scraper plate 114. As the hopper is pulled along the trench, the level of gravel within the hopper drops, and when a predetermined gravel level is reached within hopper 46, which preferably is at a time before pipe guide sleeve 60 is exposed, additional gravel is deposited in the hopper.

Because lifting bar stanchion 84 and feed guide stanchion 74 each extend upwardly, as shown in FIG. 3, preferably above the level of the surrounding ground, the position of the hopper within the trench can be readily determined by a front loader operator, even though the hopper itself may be well below the ground level.

When the required length of pipe has been laid the pipe can be cut and the hopper removed from the trench by means of lifting chains 82 and 92. The hopper can be carried to the adjoining trench to permit the installation of a second length of pipe in the adjoining trench, and so on to complete the construction of the drainage field.

Because the only portions of the hopper that contact the sides of the trench are trench contact surfaces 106, 108, at the rear portion of the hopper, and because those trench contact surfaces have only a small surface area, the frictional drag on the hopper is significantly reduced, and therefore less power is required to pull the hopper along a trench.

It will be apparent that the present hopper construction provides distinct advantages over the previously-used hoppers in that it facilitates proper placement of the pipe within the trench, it facilitates the provision of gravel at a desired level around and above the pipe, it facilitates the positioning and removal of the hopper within a trench, it facilitates the location of the hopper in a trench for refilling with gravel, and it also requires less power to draw the hopper along the trench.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Apparatus for laying flexible pipe within a trench and for embedding the flexible pipe within a bed of gravel, the trench including a trench bottom and a pair of upstanding trench side walls, said apparatus comprising:
   a. a gravel hopper adapted to be received within an excavated trench, the hopper having a pair of spaced, opposed side walls, and a pair of spaced, opposed front and rear walls, the side walls and the front and rear walls disposed to define a substantially rectangular hopper having a rectangular top opening and a rectangular bottom opening;
   b. a pipe guide sleeve carried by the hopper for receiving and guiding a pipe to be deposited in the trench, the guide sleeve extending longitudinally of the hopper from a guide sleeve inlet opening adjacent the hopper front wall to a guide sleeve outlet opening spaced rearwardly from the hopper front wall and terminating at an opening positioned forwardly of the hopper rear wall;
   c. a pipe feed guide member carried adjacent to and above the front wall for supporting and guiding a length of pipe as it moves from a point adjacent the trench to the pipe guide sleeve inlet;
   d. the hopper having a front section and a rear section, the rear section having a width greater than the width of the front section and which extends inwardly toward the front section and adapted to slidably engage the side walls the trench for guiding the hopper within the trench with minimal frictional resistance with the trench side walls as the hopper is drawn along the trench.

2. Apparatus in accordance with claim 1 wherein the hopper front and rear walls extend vertically and the hopper bottom opening is defined by the spacing between the respective side walls and the front and rear walls of the hopper to define a fully open, rectangular hopper bottom opening.

3. Apparatus in accordance with claim 1 wherein the guide sleeve outlet opening is positioned beneath the hopper rear section so that gravel contained within the hopper contacts and embeds the flexible pipe in a bed of gravel.

4. Apparatus in accordance with claim 1 wherein the pipe feed guide member includes a plurality of rollers adapted to engage opposed portions of the pipe to be laid and thereby minimize friction between the pipe and the guide member.

5. Apparatus in accordance with claim 4 wherein the hopper includes a feed guide support sleeve carried at the front of the hopper to receive the feed guide member.

6. Apparatus in accordance with claim 5 wherein the hopper includes a pair of feed guide support sleeves carried at the front of the hopper in spaced relationship to permit the feed guide member to be placed at either side of the hopper.

7. Apparatus in accordance with claim 1 wherein the pipe guide sleeve includes a runner for sliding along the trench bottom, and a spacer member extending between the runner and the pipe guide sleeve for supporting the pipe guide sleeve at a predetermined distance above the trench bottom.

8. Apparatus in accordance with claim 1 wherein the hopper includes a pair of spaced, substantially parallel runners extending longitudinally of the hopper for permitting the hopper to slide along the trench bottom.

9. Apparatus in accordance with claim 1 including connection means adjacent the front and rear walls of the hopper to enable the hopper to be lifted into and out of a ditch.

10. Apparatus in accordance with claim 9 wherein the connection means are vertically adjustable and can be adjusted to extend outside of and above the trench to facilitate locating the hopper when the hopper is within a trench.

11. Apparatus in accordance with claim 1 wherein the hopper rear section includes contact walls for slidably contacting the trench side walls.

12. Apparatus in accordance with claim 11 wherein the contact walls have a length in the longitudinal direction of the hopper that is less than about 25% of the length in the longitudinal direction of the hopper.

* * * * *